United States Patent [19]

Yonekawa

[11] Patent Number: 4,463,935
[45] Date of Patent: Aug. 7, 1984

[54] MOLTEN METAL STIRRING EQUIPMENT

[75] Inventor: Tadao Yonekawa, Hyogo, Japan

[73] Assignee: Shinmei Engineering Company Limited, Hyogo, Japan

[21] Appl. No.: 486,964

[22] Filed: Apr. 20, 1983

[30] Foreign Application Priority Data

| Apr. 23, 1982 | [JP] | Japan | 57-69309 |
| Apr. 23, 1982 | [JP] | Japan | 57-69310 |
| Jul. 14, 1982 | [JP] | Japan | 57-123644 |
| Jul. 14, 1982 | [JP] | Japan | 57-123645 |

[51] Int. Cl.³ ............................................. C22B 9/00
[52] U.S. Cl. .................... 266/233; 266/280; 75/49
[58] Field of Search ............... 266/233, 234, 211, 209, 266/235, 207, 210, 280; 75/61, 93 R, 49

[56] References Cited

U.S. PATENT DOCUMENTS

| 3,606,293 | 9/1971 | Endely | 266/209 |
| 4,008,884 | 2/1977 | Fitzpatrick et al. | 266/233 |
| 4,235,626 | 11/1980 | Semin et al. | 266/233 |
| 4,236,917 | 12/1980 | Dolzhenkov et al. | 75/61 |
| 4,328,958 | 5/1982 | Dolzhenkov | 266/233 |
| 4,355,789 | 10/1982 | Dolzhenkov et al. | 266/233 |

OTHER PUBLICATIONS

"Special Refractories", Henson, American Foundryman, May 1947, pp. 64-70.

Primary Examiner—L. Dewayne Rutledge
Assistant Examiner—S. Kastler
Attorney, Agent, or Firm—Wenderoth, Lind & Ponack

[57] ABSTRACT

A molten metal stirring apparatus stirs molten metal by sucking the molten metal into a riser linked to a melting furnace beneath the surface of molten metal in the melting furnace, and returning the molten metal in the riser into the melting furnace. The apparatus includes an electric heater for heating the riser and provided in the vicinity of the position reached by the molten metal drawn into the riser. A changeover valve is linked to the upper end of the riser. A vacuum source, for reducing the pressure inside the upper end of the riser, is connected to the changeover valve. A duct, leading exhaust gas from the melting furnace to the upper end of the riser, is connected to the changeover valve. A heater for heating the riser is provided coaxially with and on the outer periphery of the riser.

3 Claims, 9 Drawing Figures

MOLTEN METAL STIRRING EQUIPMENT

BACKGROUND OF THE INVENTION

1. Field of the Invention

The present invention relates to an apparatus for stirring molten metal by sucking the molten metal into a riser linked to a melting furnace beneath the surface of molten metal in the melting furnace, and returning the molten metal in the riser into the melting furnace.

2. Description of the Prior Art

In one known apparatus, clogging often occurs in the vicinity of the position reached by the surface of molten metal drawn into the riser. That is, air is supplied when the molten metal in the riser is returned to the melting furnace. As a result, the molten metal is oxidized, and the oxides deposit on the wall of riser, or the molten metal in the riser is partly solidified to cause clogging of the riser.

Accordingly, it is an object of the present invention to prevent clogging within the riser and by providing a molten metal agitating apparatus of simple construction.

In other prior art, for example, the upper end of the riser linked to the melting furnace beneath the surface of molten metal in the melting furnace is changed over and connected to a vacuum source or to gas source by way of a changeover valve. As such changeover valve, solenoid valves are widely used, but they are short in service life and often interrupt the continuous operation to melt the metal.

It is another object of the present invention to provide a molten metal stirring apparatus embodying easier maintenance.

SUMMARY OF THE INVENTION

To accomplish the foregoing objectives, there is provided a molten metal stirring apparatus for a melting furnace. The stirring apparatus includes a riser linked to the melting furnace beneath the surface of molten metal in the melting furnace, an electric heater for heating the riser, provided in the vicinity of the position reached by the surface of the molten metal drawn into the riser, a changeover valve linked to the upper end of the riser, a vacuum source for reducing the pressure inside the upper end of the riser and connected to the changeover valve, a duct for leading exhaust gas from the melting furnace to the upper end of the riser and connected to the changeover valve, and heating means for heating the riser and provided coaxially of, and on the outer periphery of the riser.

According to this invention, an electric heater is provided in the vicinity of the position reached by the surface of the molten metal drawn into the riser. The electric heater keeps the temperature in the riser high, so that solidification of the molten metal in the riser may be prevented. In addition, exhaust gas is supplied when the molten metal drawn into the riser returns to the melting furnace, thereby inhibiting the oxidation of the molten metal within the riser. Therefore, the riser will not be clogged by deposits of oxides of molten metal. Also, since the temperature of the exhaust gas is relatively high, for example 440° to 550° C., a temperature drop of the molten metal in the riser is prevented.

According to a preferred embodiment of the invention, the inner wall of the riser is lined with silicon carbide refractories containing silicon nitride bonding or silicon oxynitride bonding, whereby deposit of molten metal on the riser is restricted, and the strength of riser, such as spalling resistance thereof, is improved.

Still according to this invention, since gas is supplied at atmospheric pressure into the upper end of the riser when returning the molten metal drawn into the riser into the melting furnace, stirring within the melting furnace is achieved by gravity drop of the molten metal, so that agitation of the melting furnace is achieved by a simple construction.

According to this invention, since the changeover valve is operated by gas pressure, switching of electric contact as experienced in the prior art is not necessary, which facilitates maintenance.

DESCRIPTION OF THE PREFERRED EMBODIMENTS

Figure 1:
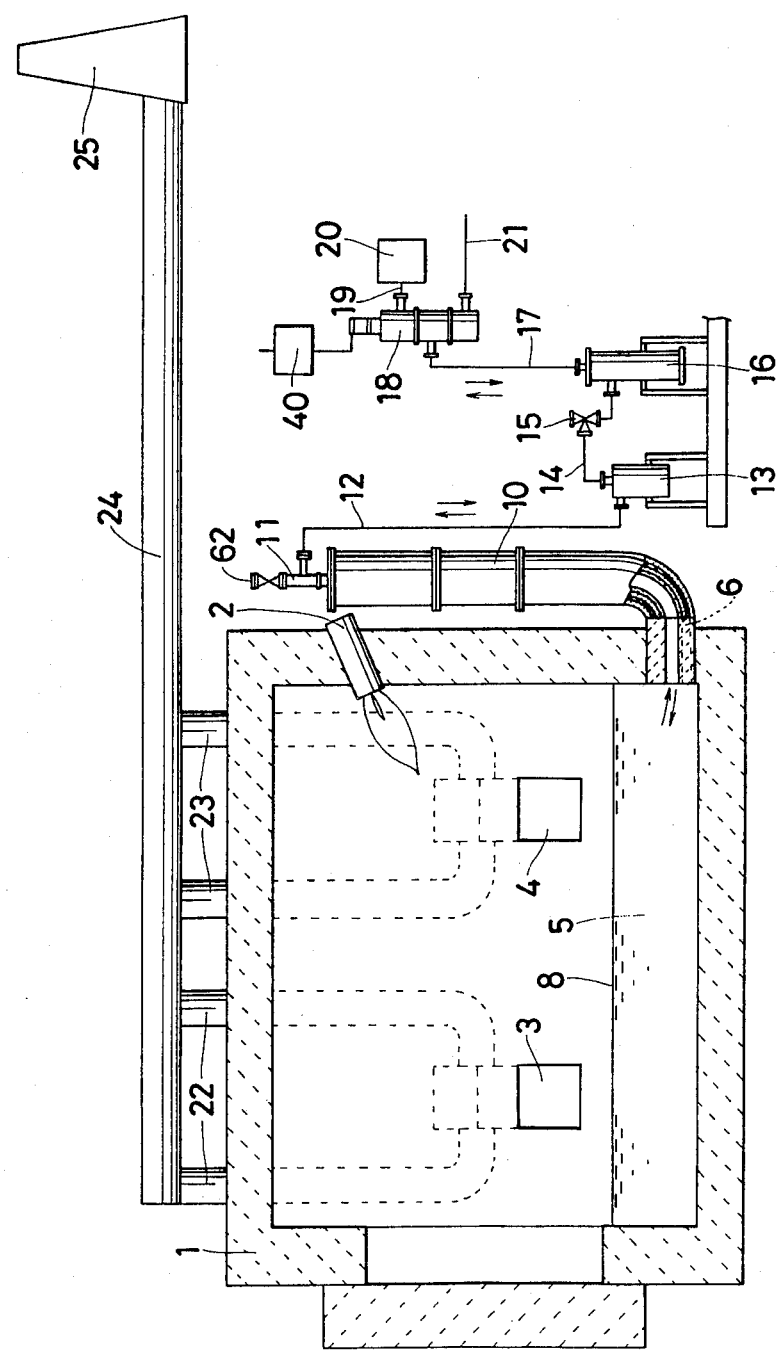
FIG. 1 is a vertical section of one embodiment of the invention.

Hereinafter are described the embodiments of the present invention while referring to the drawings.

Figure 2:
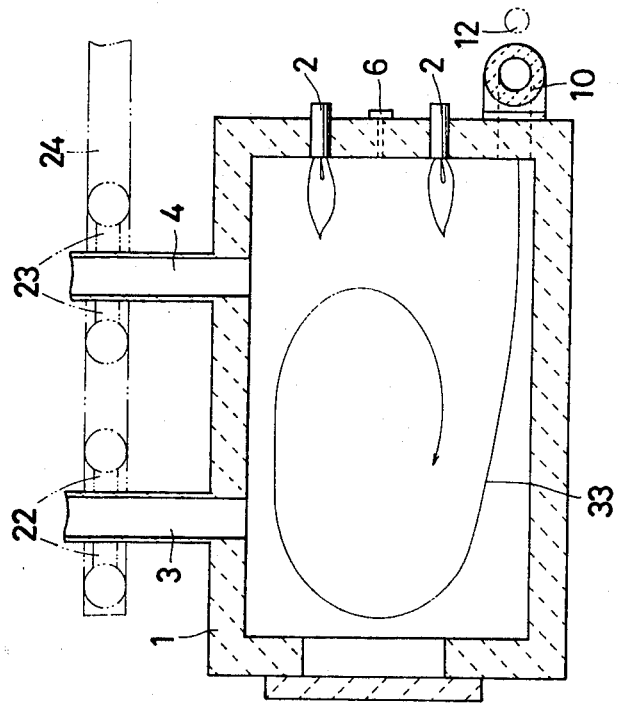
FIG. 2 is a cross section thereof.

FIG. 1 is a vertical section of one embodiment of the present invention and FIG. 2 is a horizontal section. A burner 2 is provided in a melting furnace 1. Ingots or scraps charged through charge preheat chambers 3, 4 are melted as indicated at 5. One such molten metal 5 may be, for example, aluminum. The molten metal 5 is discharged to the exterior of the furnace through an outlet 6.

Near a corner of melting furnace 1, and lower than the surface 8 of molten metal 5 in the melting furnace 1, is installed a riser 10 which extends vertically outside the melting furnace 1 and has a riser passage. An inspection window 62 is provided in the upper end 11 of the riser 10. The upper end 11 is linked with a protective tank 13 by way of pipeline 12. The protective tank 13 is linked with a 18 via pipeline 17. The pipeline 17 is connected to a vacuum source 20 via the valve 18 and a pipeline 19. At the same time, the pipeline 17 is also connected to another pipeline 21 via the valve 18. Ducts 22, 23 lead exhaust gas from the melting furnace 1 and are linked with charge preheat chambers 3, 4. Ducts 22, 23 are led to a stack 25 through duct 24, and are released to the atmosphere. The pipeline 21 is connected to the duct 24. The protective tank 13 is intended to prevent the molten metal 5 sucked in the riser 10 from partly flowing into the pipeline 12 to run into the pipeline 14 and subsequent units so as to protect the subsequent units.

Figure 3:
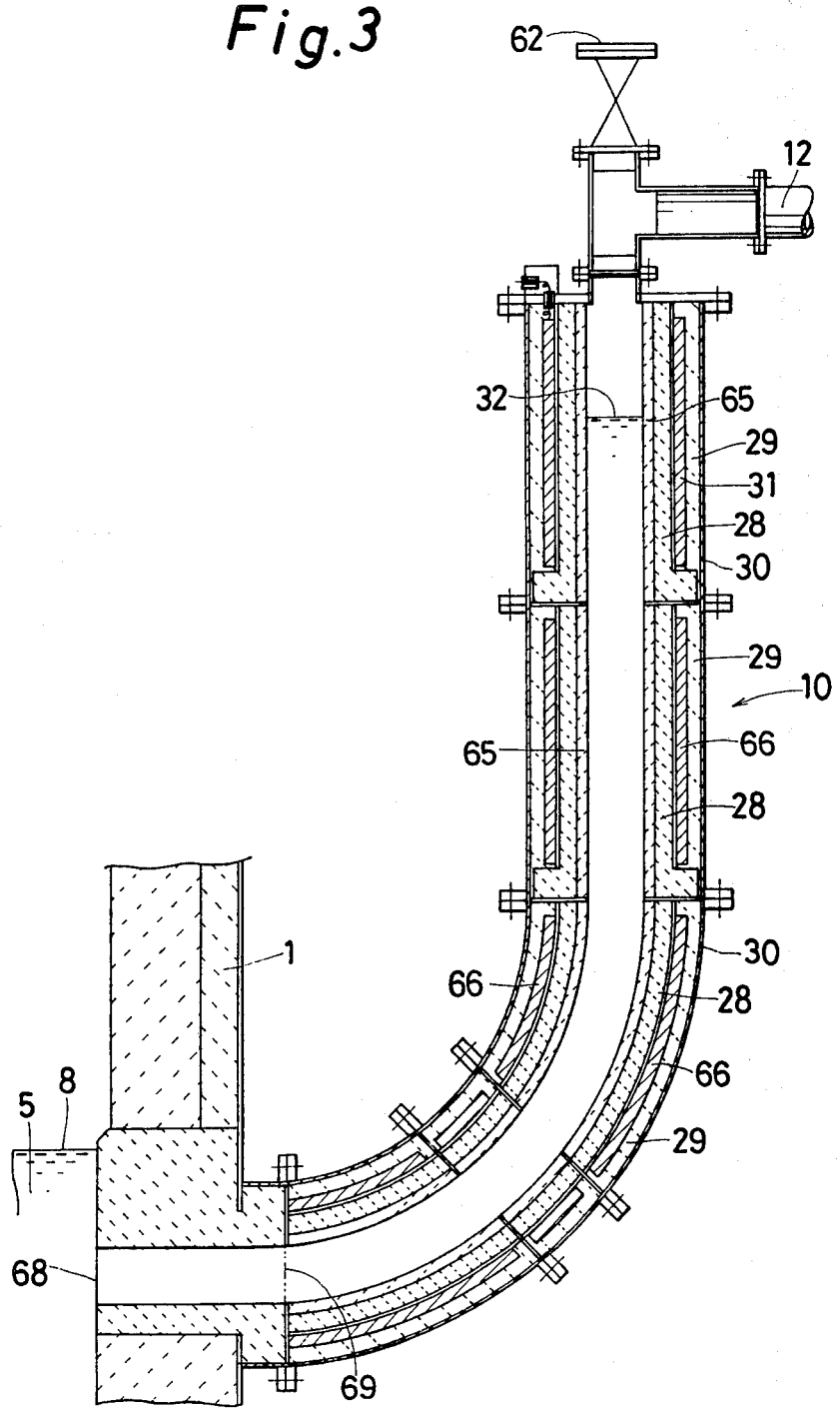
FIG. 3 is a magnified section of a riser thereof.

FIG. 3 is a magnified section of the riser 10. An inlet 68 of molten metal into the riser 10 of melting furnace 1 is illustrated as being of circular form. However, inlet 68 is not limited to being of circular form, and for example, it may be of oval form extending in the horizontal direction (the direction vertical to the sheet surface of FIG. 3) or other forms, provided that it of circular form in the bottom 69 of the riser 10. The inner wall of the riser 10 is lined with silicon carbide refractories 65 containing silicon nitride bonding or silicon oxynitride bonding. The chemical composition of the silicon carbide refractories 65 is, for example, silicon carbide 78.0 wt.%, silicon dioxide 3.0 wt.%, ferric oxide 0.4 wt.%, and a total of silicon nitride ($Si_3N_4$) and silicon oxynitride ($Si_2ON_2$) 18.0 wt.%. The outer periphery of the silicon carbide refractories is covered, for example, with ceramic heat insulating material 28. An electric heater 31 is provided at the upper end of the riser 10 on the outside of the heat insulating material 28. This electric heater 31 is electrically energized to heat the inner temperature of the heat insulating material 28 surrounded with the electric heater 31 to a temperatures higher than the melting point of the molten metal, for example, 650° to 750° C. This along its entire circumference and overall length. This electric heater 66 is similarly energized with electric power to heat the inner parts of the heat insulating material 28 surrounded by the electric heater 66 to temperatures higher than the melting point of the molten metal. Accordingly, solidification of the molten metal in the riser 10 is prevented. The outer surfaces of the electric heaters 31 and 66 are covered with insulators 29, which are further covered with outer skin 30 made of iron or similar material. The insulators 29 may be, for example, castable refractories made of alumina cement.

When the pipelines 17 and 19 are connected together by way of three-way valve changeover valve 18, the pipeline 12 is lowered in pressure, and the molten metal 5 in the melting furnace is sucked into the riser 10. The surface of the molten metal 5 drawn into the riser 10 is, as clearly shown in FIG. 3, at a level shown at 32. Thereafter, the three-way changeover valve is changed over, and the pipeline 17 is connected with the pipeline 21. Hence, exhaust gas is led into the pipeline 12 from the duct 24 through the pipeline 21. The temperature of the exhaust gas is relatively high, for example, 400° to 550° C. The exhaust gas is introduced into the riser 10 as the molten metal in the riser 10 returns to the melting furnace by gravity. Thus, since the natural gravity drop of the molten metal is utilized, the construction may be simplified. As the molten metal in the riser returns to the melting furnace, the molten metal in the melting furnace is stirred by indicated as arrow 33 in FIG. 2. In this embodiment, the riser 10 is provided near a corner of melting furnace 1, but it may be located at other positions.

The oxygen concentration of the exhaust gas is low, and oxidation of the molten metal sucked into the riser 10 is inhibited. This contributes to restriction of clogging due to oxides in the riser 10.

Figure 4:
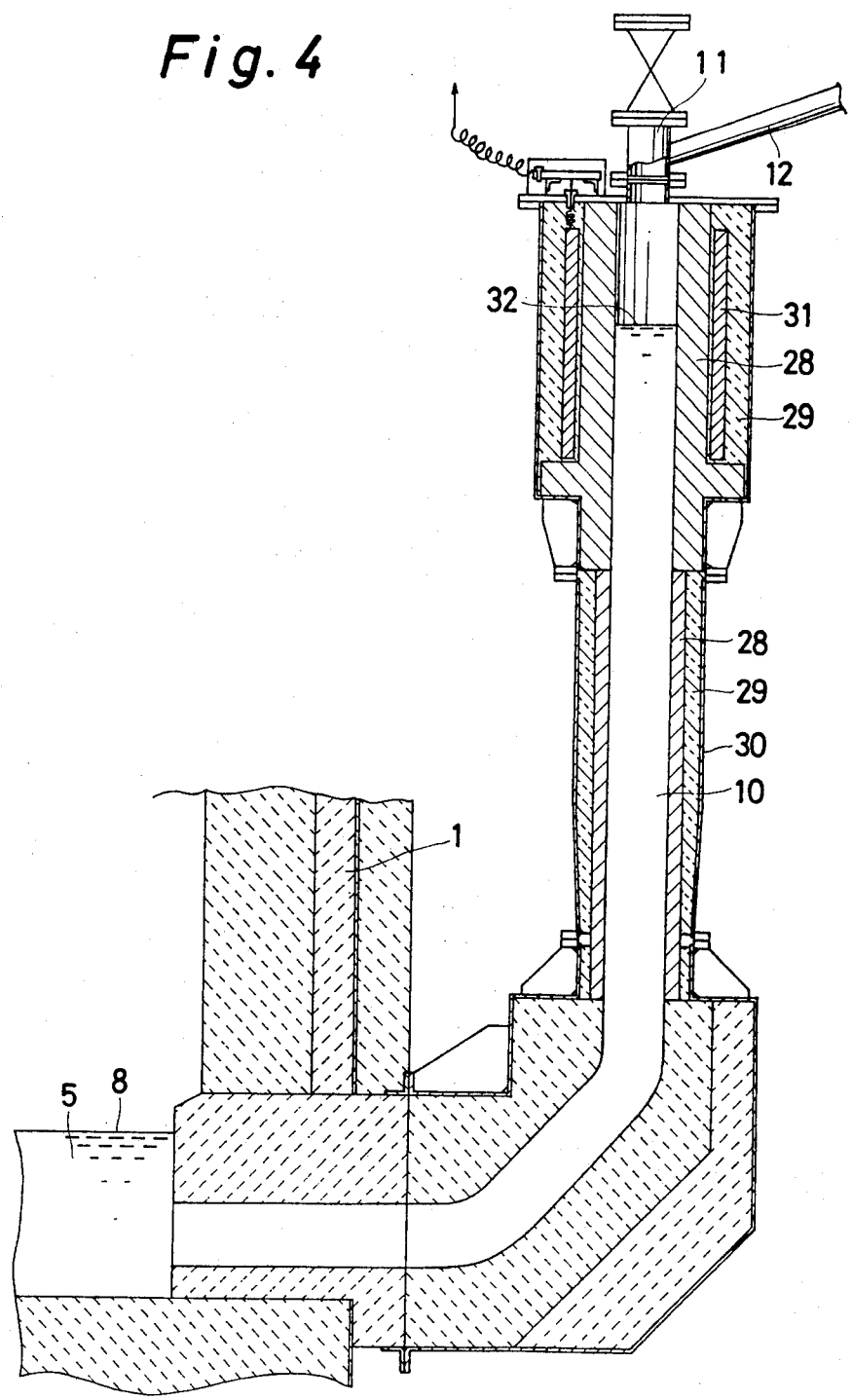
FIG. 4 is a magnified section of a riser in another embodiment.

FIG. 4 is a magnified section of another embodiment of riser 10 wherein parts corresponding to those of the preceding embodiment are given the same reference numeral. The inside of the riser 10 in its radial direction is composed of heat insulating materials 28, which are externally covered with insulators 29. The insulators 29 are further covered with an outer skin 30 of iron or other material. At the upper end of the riser, an electric heater 31 is provided in a manner to surround the heat insulating materials 28. Electric heater 31 is electrically energized to heat the inner parts of the heat insulating materials 28 surrounded by the electric heater 31 to temperatures higher than the melting point of the molten metal, for example 650° to 750° C. As a result, solidification of the molten metal is prevented in the vicinity of the surface 32 where the molten metal drawn into the riser 10 reaches. Hence, clogging in the riser 10 is prevented.

Figure 5:
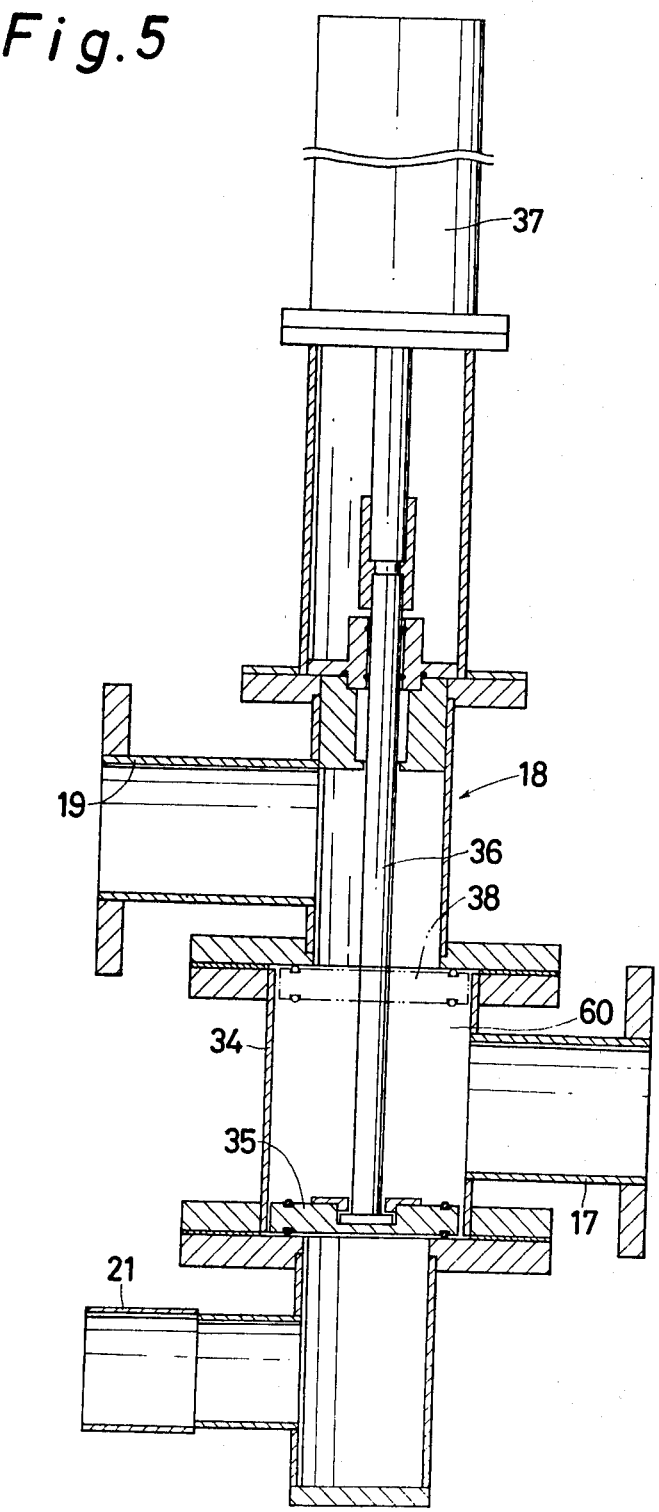
FIG. 5 is a sectional view of a three-way changeover valve.
Figure 6:
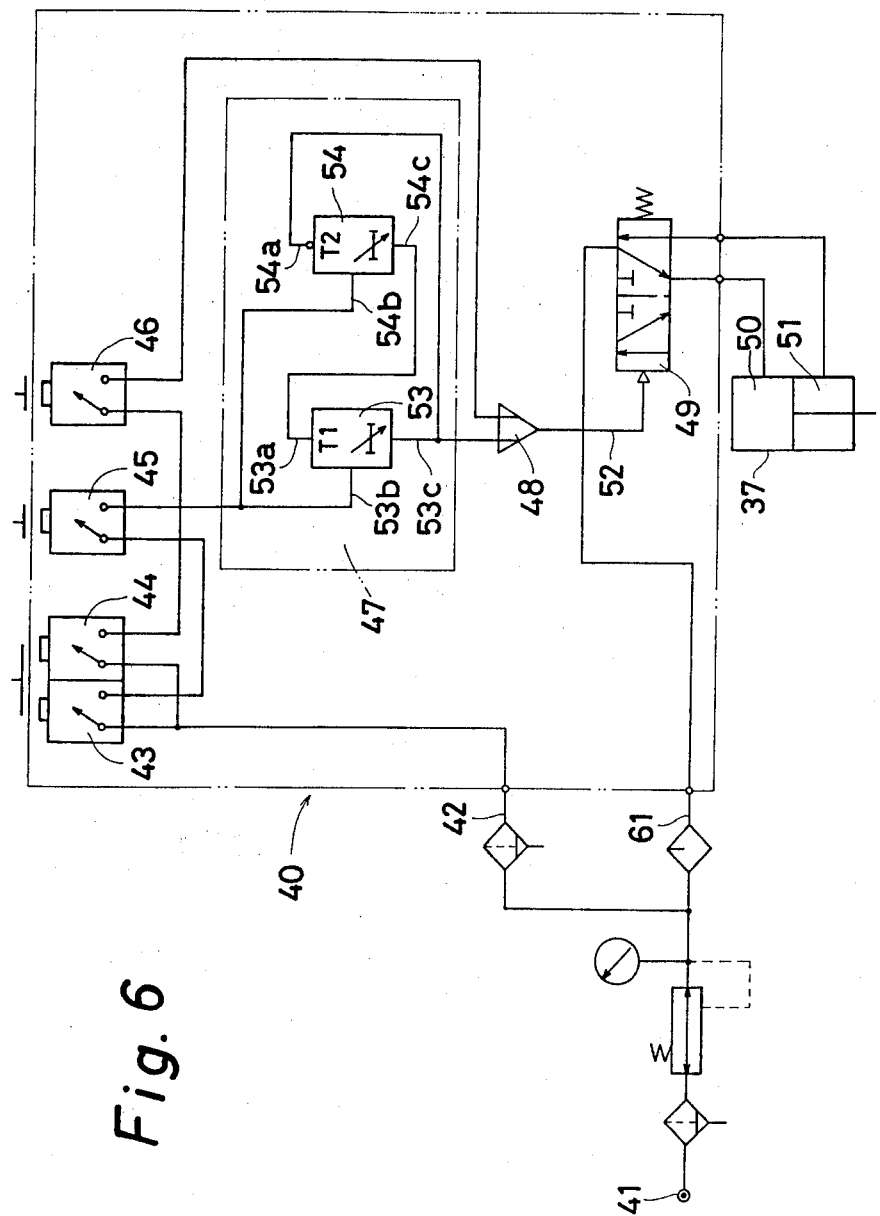
FIG. 6 is an pneumatic circuit diagram of a control device.

FIG. 5 is a sectional view showing a actual constitution of three-way changeover valve 18. A valve disc 35 is housed in a valve casing 34. A valve stem 36 fixed to valve disc 35 is controlled by a control unit 40 shown in FIG. 1. The valve stem is displaced and driven reciprocally in the axial direction (the vertical direction in FIG. 5) by means of a pneumatic cylinder 37. When the pneumatic cylinder 37 is extended and the valve disc 35 is in the position shown in FIG. 5, the pipeline 17 is communicated with the pipeline 19 by way of valve chamber 60, so that the molten metal 5 is sucked into the riser 10. When the pneumatic cylinder 37 is contracted and the valve disc 35 is held in a position indicated by dashed lines 38, the pipeline 17 is communicated with the pipeline 21 by way of valve chamber 60, so that exhaust gas is supplied into the riser 10. The three-way changeover valve 18 may have other constructions.

In the embodiment of FIG. 3, the electric heater 66 is provided coaxially of the riser 10 and along its entire circumference and overall length, beneath the position where the electric heater 31 is provided at the upper end of the riser 10, in a manner to surround the heat insulating materials 28. In another embodiment, the electric heater 66 may be partially provided coaxially of the riser 10 and externally surrounding it.

In the preceding embodiment, the heating means consisted of electric heaters 31 and 66 provided coaxially of the riser and along its entire circumference and overall length. However, in another embodiment, the heating means may be so constituted to supply high temperature gas higher than the melting point of the molten metal beneath the electric heater, coaxially of the riser 10 and along its entire circumference and overall length, in place of electric heater valves 43, 44. The operating valve 43 is connected to an operating valve 45. The operating valve 44 is connected to an operating valve 46. The air pressure from the operating valve 45 is applied to a timer circuit 47. The air pressure from the timer circuit 47 and operating valve 46 is applied to an OR circuit 48 and pilot pipeline 52 as the pilot pressure of a two-position changeover valve 49 of a spring offset type pilot operating system. The air pressure from the air pressure source 41 is changed over and applied to either chamber 50 or 51 of the pneumatic cylinder 37 by way of changeover valve 49 from a pipeline 61.

Figure 9:
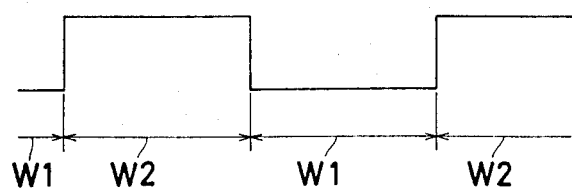
FIG. 9 is a waveform diagram showing the operating state of a timer circuit.

In order to stir the molten metal 5 in the melting furnace 1 automatically, the operating valves 43, 45 are operated in a communicated state. Hence, the timer circuit 47 releases a supply of air pressure into pilot pipeline 52 for a first time interval W1 as shown in FIG. 9, and supplies air pressure to the pilot pipeline 52 for a time interval W2. Thus, the chamber 50 in the pneumatic cylinder 37 is raised to high pressure for time interval W1, and the pipelines 17 and 19 are communicated with each other, and the molten metal 5 is sucked into the riser 10. In the next time interval W2, the chamber 51 in the pneumatic cylinder 37 is raised to high pressure, and the pipelines 17 and 21 are communicated with each other, thereby supplying exhaust gas into the riser 10. For example, the duration of W1 is 4 to 10 seconds, and that of W2 2 to 4 seconds.

Figure 7:
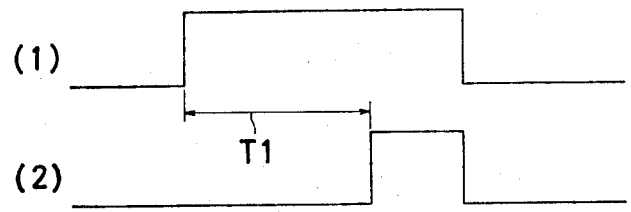
FIG. 7 is a waveform diagram showing the operating state of an on-delay circuit.
Figure 8:
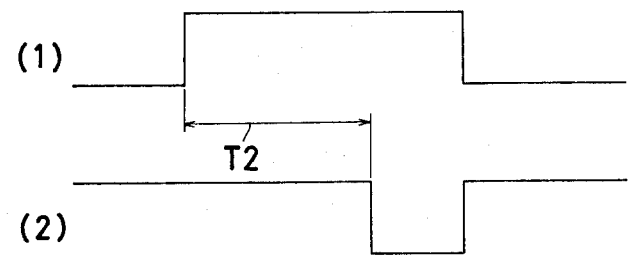
FIG. 8 is a waveform diagram showing the operating state of an off-delay circuit.

An on-delay circuit 53 contained in the timer circuit 47 operates as shown in FIG. 7. This on-delay circuit 53 communicates ports 53b and 53c after lapse of time T1 as shown in FIG. 7 (2) when an air pressure indicated by FIG. 7 (1) is supplied to pilot port 53a. On the other hand, an off-delay circuit 54 disconnects ports 54b, 54c after lapse of time T2 as shown in FIG. 8 (2) when an air pressure indicated by FIG. 8 (1) is supplied to pilot port 54a.

When changing the changeover valve 49 manually, the operating valve 44 should be kept in a communicated state, and the operating valve 46 is disconnected. In this state, air pressure is not supplied to the pilot pipeline 52, and the riser 10 is connected with the vacuum source 20. When the operating valve 46 is communicated while the operating valve 44 is kept in the communicated state, air pressure is applied to the pilot pipeline 52, so that exhaust gas may be supplied to the riser 10.

In the preceding embodiment, the pipeline 21 is connected to the duct 24 in order to supply exhaust gas into the riser. In another embodiment, the pipeline 21 may be also communicated with the atmosphere, wherein ambient-temperature air is supplied into the riser 10 at atmospheric pressure.

The invention may be embodied in other specific forms without departing from the spirit or essential characteristics of the invention. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a melting furnace of the type including a melting chamber for melting therein metal to form molten metal, and means for discharging exhaust gases from said melting chamber, the improvement comprising:
   a riser extending upwardly from said furnace and having a riser passage connected to said melting chamber at a level beneath the surface of the molten metal therein;
   a vacuum source;
   means for selectively connecting said vacuum source to said riser passage, thereby to reduce the pressure therein and to draw molten metal from said melting chamber upwardly into said riser passage, and for disconnecting said vacuum source from said riser passage and connecting said riser passage to atmospheric pressure, thereby to enable the molten metal drawn into said riser passage to return to said melting chamber by gravity, said connecting and disconnecting means comprising a changeover valve connected to said vacuum source and to said riser passage and having a valve member movable between a first position, whereat said vacuum source and said riser passage are connected, and a second position, whereat said vacuum source and said riser passage are disconnected;
   means for, when said riser passage is connected to atmospheric pressure, preventing oxidation of the molten metal returning from said riser passage to said melting chamber, and thereby for preventing clogging of said riser passage by oxides of the metal, said preventing means comprising a duct connected to said exhaust gas discharging means and to said changeover valve at a position such that when said valve member is in said second position thereof the exhaust gases pass through said duct and said changeover valve to said riser passage;
   fluid pressure operated means for controlling movement of said valve member between said first and second positions thereof; and
   electric heating means for heating said riser at least at the vicinity of the position thereof which is reached by the molten metal drawn into said riser passage.

2. The improvement claimed in claim 1, wherein said electric heating means extends around the entire circumference of and along the entire length of said riser.

3. The improvement claimed in claim 1, wherein said riser includes an inner wall lined with refractory bodies having silicon nitride bonding or silicon oxynitride bonding.

* * * * *